INVENTOR.
Hiroto Masai
BY
Pierce, Schiffler & Parker
Attorneys

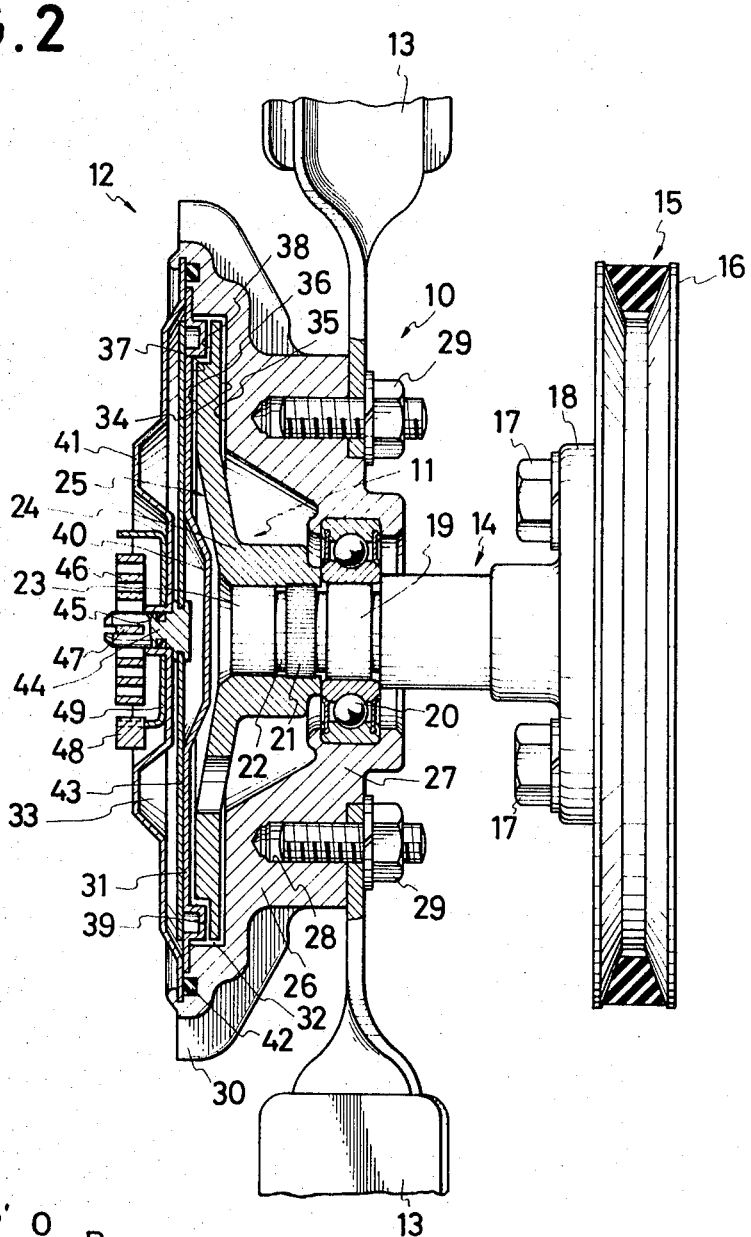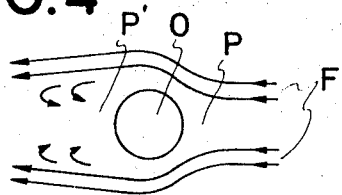

FLUID DRIVE COUPLING

BACKGROUND OF THE INVENTION

The present invention relates to drive couplings of the type embodying a fluid medium for transmitting torque between relatively rotatable input and output coupling members, and more particularly to a thermostatically controlled driving device wherein a fluid shear medium transmits torque between the rotatable coupling members. Fluid couplings of the above noted type are in particular usable for driving an engine accessory such as a cooling fan device of an internal combustion engine.

Generally, the cooling fan device the speed ratio of which is increased or decreased depending upon the engine speed is attached to the fluid coupling designed for use in summer, so that the engine is excessively cooled such as when it is used in winter and in high-speed running since the outside lower temperature or ram air is also supplied thereto. This is not desirable because the durability of the prime mover is reduced, the thermal efficiency declines and acceleration of the vehicle becomes insufficient.

In order to overcome the above difficulties, there has been used a thermostatically controlled coupling device which is responsive to the air temperature. The conventional fluid coupling of this type is comprised of a driven casing rotatably mounted on an input shaft, a fluid chamber constituted between the driven member and a cover member fixed thereto, a driving rotor securely mounted on the input shaft and disposed in the fluid chamber, and a temperature differential responsive element such as a bimetallic element which controls the volume of viscous fluid in the fluid chamber in response to the surrounding air temperature. The volume of viscous fluid to actuate the driving member is increased or decreased depending upon the temperature variations so that the internal combustion engine is less cooled by the fan assembly when the temperature of the engine is below the normal level, for instance at the starting of the vehicle, while it is more cooled thereby when the temperature rises above the normal level. So it is preferably that the minimum value of the torque transmitted to the output member from the input member is nearly zero whilst the maximum value thereof is as high as possible. In other words, just after the starting of the vehicle it is desirable not to operate the fan assembly until the temperature of the prime mover rises to the appropriate level while when the engine temperature increases to approximately the proper condition it is desirable to vary the amount of the cooling air to the engine, that is to say, of the viscous fluid to the driving member, in response to the temperature.

However, in the conventional coupling devices wherein the minimum value of transmitting torque to the output member is nearly zero a pumping plate is used which decreases or discharges the viscous fluid from the driving rotor, the maximum value thereof is not so high as to accomplish the above functional purpose since there have been provided no means adapted to be so actuated.

SUMMARY OF THE INVENTION

It is, therefore, a primary object of this invention to provide a novel coupling device of the temperature responsive type wherein viscous fluid is sufficiently and quickly applied to the driving member as it is required; and consequently the maximum value of transmitting torque is much higher than heretofore.

The above and other objects and advantages of the invention are attained by a construction comprising a valve or partition plate rigidly mounted on an output member to divide fluid chamber means into a working chamber and a reservoir chamber, discharge means for displacing viscous fluid from the working chamber to the reservoir chamber, inlet means for displacing the fluid from the reservoir chamber to the working chamber, an impact element disposed between the discharge and inlet openings and against the fluid flow in the working chamber. The fluid pressure in the working chamber near the discharge opening is higher than that in the reservoir chamber because of presence of the impact element whilst the fluid pressure in the working chamber near the inlet opening is lower than that in the reservoir chamber. According to this invention, either of the discharge or inlet openings is partially or wholly covered by a valve arm responsive to a bimetal element so that when the discharge opening is covered thereby for instance when running at a very high speed, the viscous fluid is quickly and sufficiently introduced to the working chamber from the reservoir chamber through the inlet opening so as to fully operate the driving member.

With the above and other object in view, as will hereinafter appear, the invention comprises the devices, combinations and arrangements of parts hereinafter set forth and illustrated in the accompanying drawings of two embodiments of the invention, from which the several features of the invention and the advantages attained thereby will be readily understood by those skilled in the art.

BRIEF DESCRIPTION OF THE DRAWINGS

In the drawings:

FIG. 2 is a view taken in cross section in the plane of the line 2—2 of FIG. 1.

FIG. 4 shows a principle of this invention;

DETAILED DESCRIPTION

The present invention provides in general a fluid coupling wherein a viscous fluid shear medium cooperates with input and output coupling members to transmit torque therebetween, and the coupling is constructed for heavy duty use to provide a relatively high output torque without being excessively large. Also, the volume of the fluid medium cooperating with the input and output coupling members can be varied to vary the amount of torque transmitted to the output coupling member.

Figure 1:
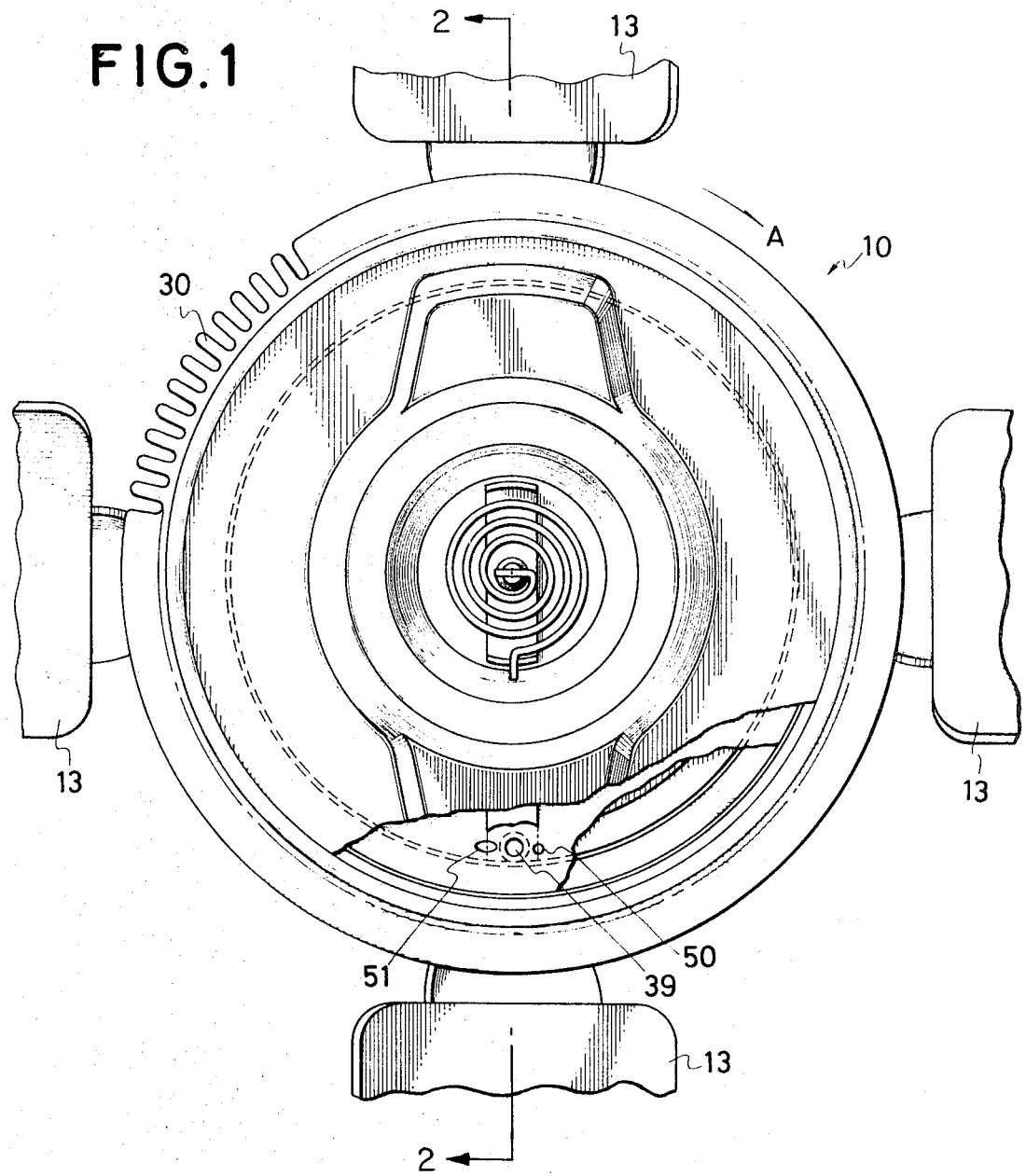
FIG. 1 is a fragmentary front elevation view partly in section of a fan assembly and a fluid coupling of this invention applied thereto.
Figure 5:
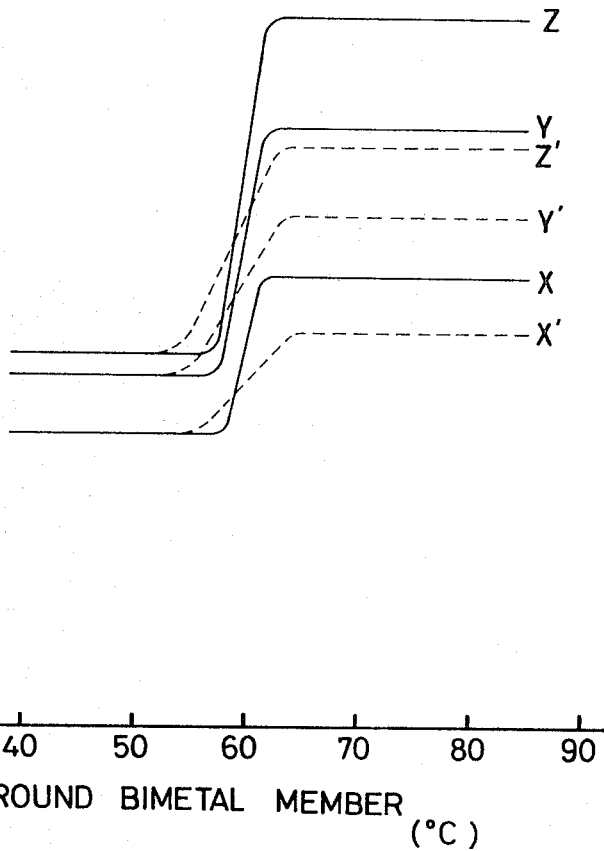
FIG. 5 illustrates characteristic curves showing in comparative manner r.p.m. of output members according to this invention in comparison with the conventional output members.
Figure 3:
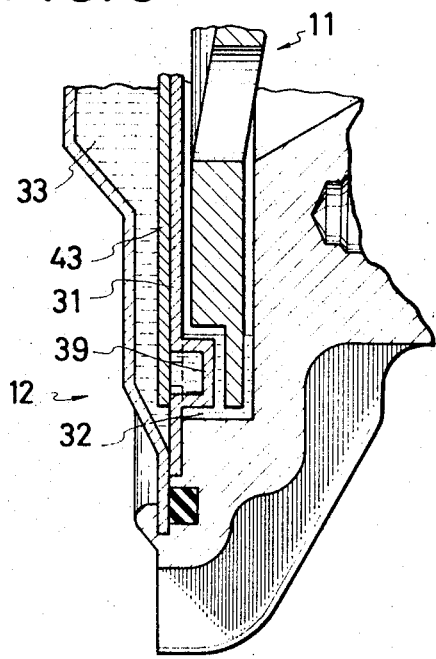
FIG. 3 is an enlarged view of a portion of the structure shown in FIG. 2.

As representing an embodiment of the present invention (see FIGS. 1 and 2) a fluid coupling 10 is shown in the drawings and includes an input coupling member 11 and an output coupling member 12. The coupling 10 is here shown as a drive for an engine accessory and specifically as a drive for a radiator cooling fan device. It is to be understood, however, that all the novel features of the preferred embodiment of the present invention are not limited in application to a fan drive.

Referring to the drawings more specifically, FIG. 2 shows a cooling fan engine accessory including fan blades 13, which are driven from the engine through the fluid coupling 10. The fluid coupling includes an input shaft 14 on which input member 11 is mounted and which is rotatable as by a belt drive 15 from the vehicle engine (not shown) including a pulley member 16. The pulley member 16 is connected to the input shaft 14 at one end thereof by suitable screws 17 which extend through flange portion 18 on the end of the shaft 14 and through openings in the pulley member.

The input shaft 14 has intermediate its ends a reduced shaft portion 19 functioning as a support for the inner race of ball bearing assembly 20. Another shaft portion 21 is provided with surface serrations and a reduced diameter portion 22 connects shaft portion 21 with a further shaft portion 23, at the end of shaft 14 opposite the end having the flange portion 18.

the input member 11 of this invention is rotated 2,000 r.p.m. as indicated by X, the output member 12 is rotated about 250 r.p.m. more than the conventional input rotor is rotated as indicated by X'. When the input member 11 is rotated 3,000 r.p.m. as indicated by Y, the output member 12 is rotated nearly 370 r.p.m. more than the conventional input member is rotated as indicated by Y', and when the driving member 11 is rotated 4,000 r.p.m. as indicated by Z, the casing 12 is rotated nearly 550 r.p.m. more than the conventional member is rotated as indicated by Z'. It will be readily apparent that as the temperature increases fan blades mounted on the fluid coupling of this invention are rotated more rapidly than heretofore.

Figure 6:
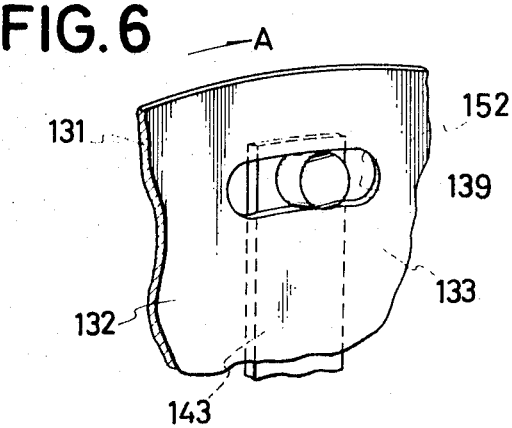
FIG. 6 is a fragmentary perspective view of a modification of this invention showing a principal portion thereof.

The modification shown in FIG. 6 operates substantially in the same manner wherein a valve arm element 143 disposed in a reservoir chamber 133 comprises an impact element 139 projecting into a working chamber 132 on the radially outward end thereof, and an elongated slot 152 provided in a partition member 131 slidably receives the impact element 139 of the valve arm therein. The valve arm 143 is adapted to move in the slot 152 by a bimetallic element (not shown) depending upon the surrounding temperature. When the viscous fluid flows to transmit torque in the clockwise direction as indicated by arrow A, as the temperature increases the valve arm 143 with the impact element 139 is rotated in the counterclockwise direction, in other words, from the right to the left as viewed in FIG. 6 in order to discharge the fluid in the working chamber 132 to the reservoir chamber 133.

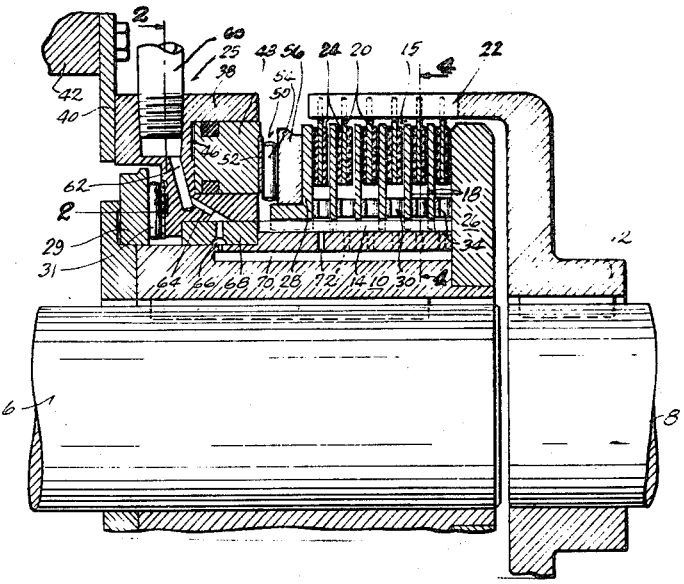

I claim:

1. A fluid-coupling device comprising a first rotatable member defining a fluid chamber, a second rotatable member rotatably mounted on said fluid chamber, said first and second rotatable members having spaced opposed surface portions defining a shear space therebetween and cooperable with a fluid shear medium within said shear space to provide a shear-type fluid drive between said rotatable members, a partition member securely mounted on said first rotatable member and dividing said fluid chamber into a working chamber and a reservoir chamber, an impact element projecting into said working chamber, said partition member being provided with an inlet opening and a discharge opening disposed circumferentially on opposite sides of said impact element, said inlet and discharge openings being disposed behind and in front of said impact element respectively with respect to the rotational direction of movement of said rotatable members, a valve plate means disposed within said reservoir chamber and slidably movable on the surface of said partition member to control the flow of fluid to and from said working chamber through said openings, temperature responsive means operatively connected to said valve plate means, whereby said inlet opening is closed by said valve plate means when the atmospheric temperature is relatively low and whereby said discharge opening is closed when the atmospheric temperature is relatively high, the fluid shear medium flowing between said working chamber and said reservoir chamber in response to changes in atmospheric temperature.

2. A fluid-coupling device as claimed in claim 1 wherein said impact element is formed integrally with said partition member.

3. A fluid-coupling device as claimed in claim 1 wherein said inlet and discharge openings are formed by a circumferentially elongated slot in said partition member and said impact element is mounted on said valve plate means to be movable within said slot.

4. A fluid-coupling device according to claim 1 wherein said valve plate means is an arm extending radially of the axis of said rotatable members.

5. A fluid-coupling device as claimed in claim 1 wherein said temperature responsive means is a bimetal strip connected with said first rotatable member at its one end and connected with said valve plate means at its other end to cause the sliding movement of said valve plate means.

United States Patent

[11] 3,613,848

| [72] | Inventor | Donald H. Reiff<br>Cedarburg, Wis. |
| [21] | Appl. No. | 857,867 |
| [22] | Filed | Sept. 15, 1969 |
| [45] | Patented | Oct. 19, 1971 |
| [73] | Assignee | Stearns Electric Corporation<br>Milwaukee, Wis. |

[54] FLUID ACTUATED AND LUBRICATED CLUTCH WITH SPLINED RELEASE SPRINGS
6 Claims, 5 Drawing Figs.

[52] U.S. Cl. .................................................. 192/70.28,
192/85 CA, 192/113 B, 267/162
[51] Int. Cl. .......................................................... F16d 25/00
[50] Field of Search............................................ 192/85 CA,
113 B, 70.28

[56] References Cited
UNITED STATES PATENTS

| 2,639,013 | 5/1953 | Meschia .......................... | 192/70.28 X |
| 3,016,119 | 1/1962 | Rosenberger et al. ......... | 192/70.28 X |
| 3,171,522 | 3/1965 | Petrie et al. .................... | 192/70.28 |
| 3,249,189 | 5/1966 | Schjolin et al. ................ | 192/70.28 X |
| 3,429,410 | 2/1969 | Hansen........................... | 192/85 CA |
| 3,412,834 | 11/1968 | Root............................... | 192/85 CA |

*Primary Examiner*—Benjamin W. Wyche
*Attorney*—Wheeler, House & Wheeler

ABSTRACT: A stack of coupling disks for frictionally clutching relatively rotatable shafts has interleaved convoluted springs splined to the shafts for clutch release. The disks are subjected to fluid pressure through a needle bearing from a relatively fixed ram. A separate source of liquid is conducted from a fixed portion of the ram into one of the relatively movable clutch parts and fed to various disks of the stack.